United States Patent
Barker et al.

(10) Patent No.: US 7,584,470 B2
(45) Date of Patent: Sep. 1, 2009

(54) METHOD AND SYSTEM FOR PEER-TO-PEER SOFTWARE DISTRIBUTION WITH A PACKAGE BUILDER

(75) Inventors: David Alexander Barker, Chandler's Ford (GB); Gary Paul Noble, Near Boradway (GB)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 11/111,586

(22) Filed: Apr. 21, 2005

(65) Prior Publication Data

US 2005/0240921 A1  Oct. 27, 2005

(30) Foreign Application Priority Data

Apr. 22, 2004  (GB) ................. 0408919.9

(51) Int. Cl.
*G06F 9/44* (2006.01)
*G06F 9/445* (2006.01)

(52) U.S. Cl. .............. 717/177; 717/172; 717/176; 717/171; 717/174; 717/168

(58) Field of Classification Search ............. 717/177, 717/178
See application file for complete search history.

(56) References Cited

U.S. PATENT DOCUMENTS

| 6,535,915 | B1* | 3/2003 | Valys et al. ............ 709/222 |
| 7,181,731 | B2* | 2/2007 | Pace et al. ............ 717/136 |
| 2002/0010808 | A1* | 1/2002 | Wiggins et al. ........ 709/328 |
| 2002/0069282 | A1* | 6/2002 | Reisman ............ 709/227 |
| 2002/0092004 | A1* | 7/2002 | Lee et al. ............ 717/140 |
| 2002/0129356 | A1* | 9/2002 | Hellerstein et al. ...... 717/177 |
| 2002/0138559 | A1* | 9/2002 | Ulrich et al. .......... 709/203 |
| 2004/0107242 | A1* | 6/2004 | Vert et al. ............ 709/203 |
| 2005/0149925 | A1* | 7/2005 | Pichetti et al. ........ 717/177 |
| 2005/0216548 | A1* | 9/2005 | Wormington et al. .... 709/201 |
| 2006/0143129 | A1* | 6/2006 | Holm et al. ............ 705/52 |
| 2007/0169109 | A1* | 7/2007 | Neswal ............ 717/174 |

FOREIGN PATENT DOCUMENTS

| WO | WO 01/53938 A1 | 7/2001 |
| WO | WO 2004/070589 A1 | 8/2004 |

* cited by examiner

*Primary Examiner*—Insun Kang
(74) *Attorney, Agent, or Firm*—William Steinberg; Greenblum & Bernstein P.L.C.

(57) ABSTRACT

A method and system for software and data distribution are described in which an original software and/or data package is provided to a first device. The first device installs the original software package, which includes installing a package builder kit. The package builder kit allows a software distribution kit to be built by the first device. The software distribution kit can be transmitted from the first device to a second device for installation on the second device. The package builder kit includes a copy of an original configuration file from the original software package, details as to the installed files, addresses of the installed files on the first device, details of the internal structure of the original software package, and provides an executable program to build the software distribution kit.

27 Claims, 7 Drawing Sheets

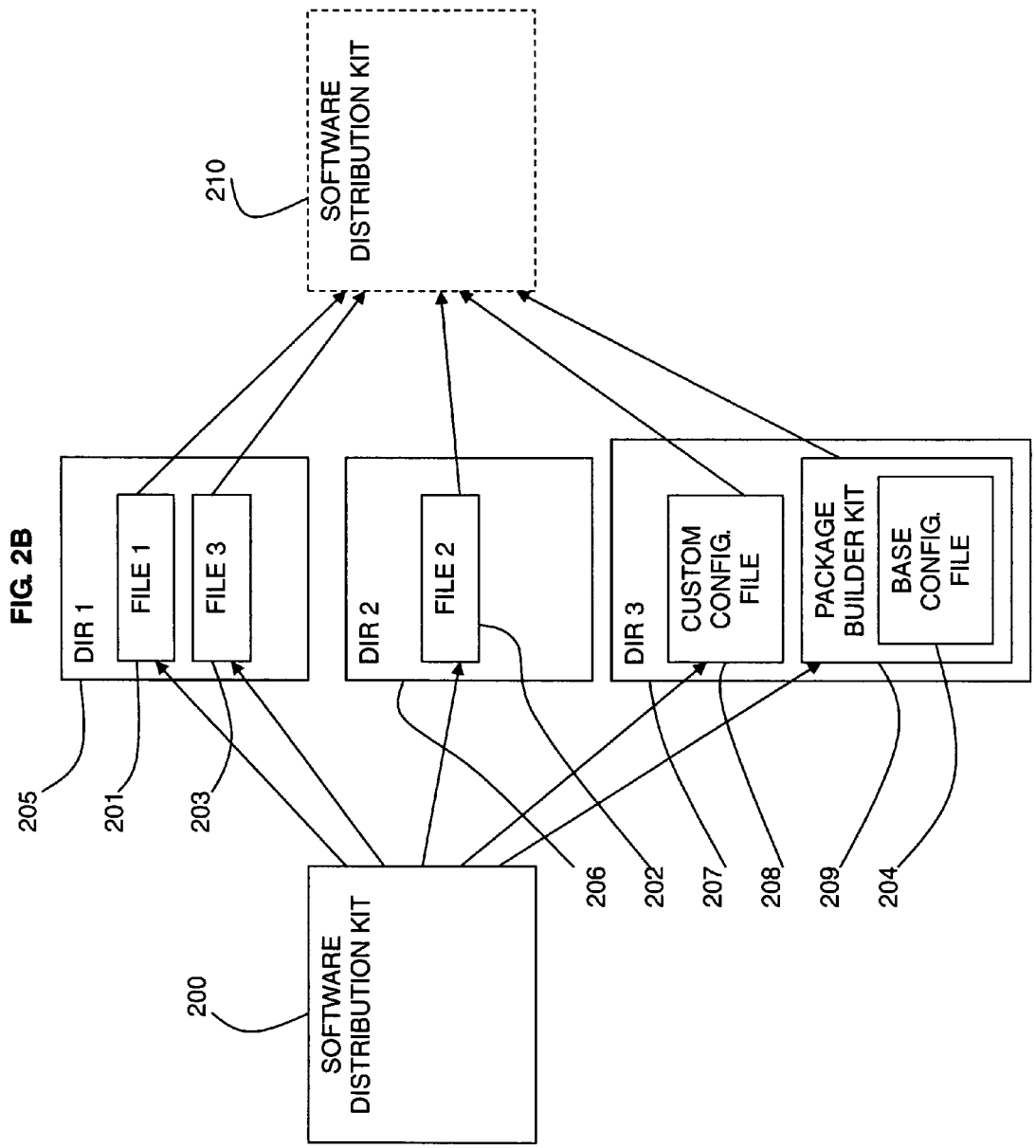

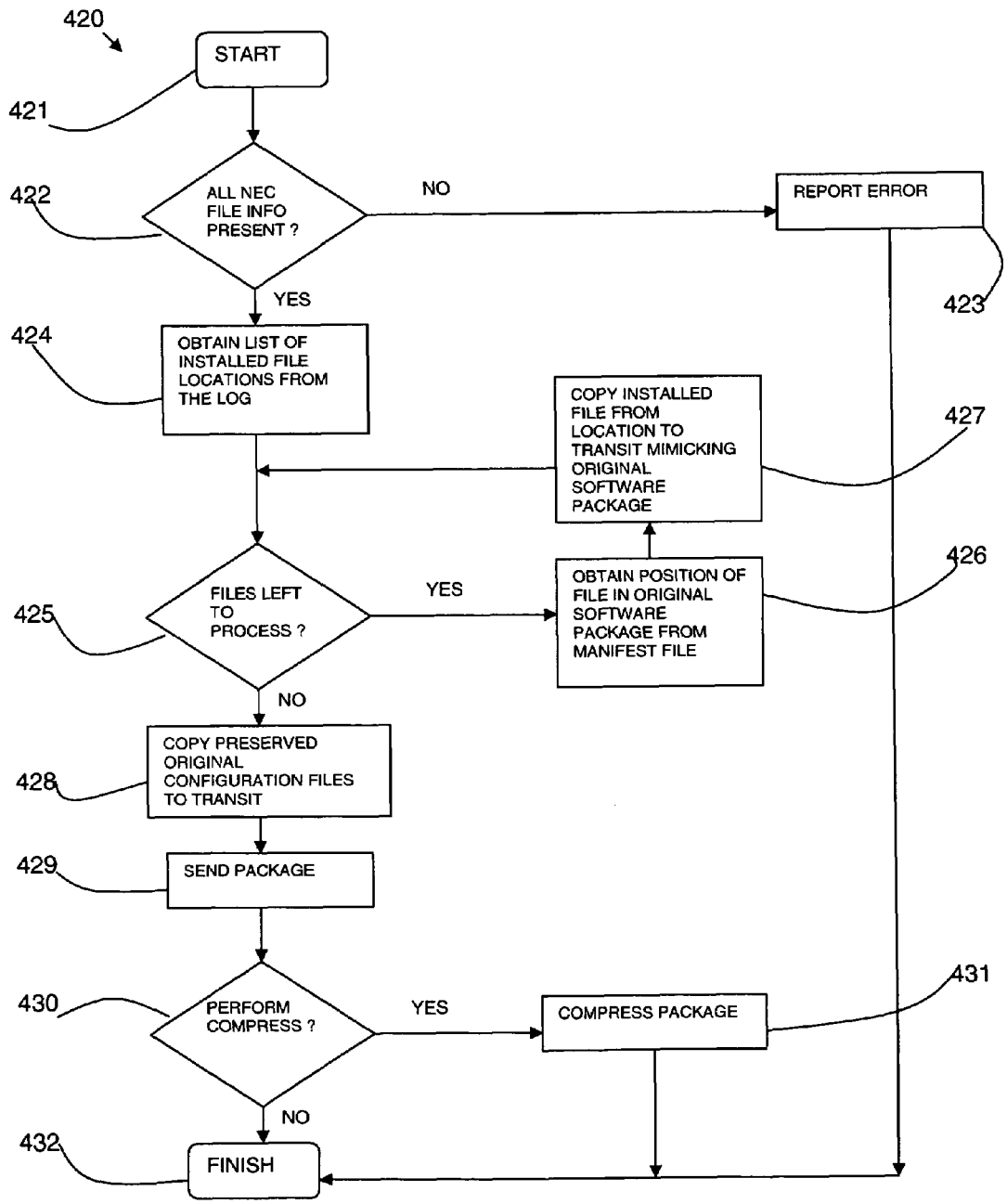

METHOD AND SYSTEM FOR PEER-TO-PEER SOFTWARE DISTRIBUTION WITH A PACKAGE BUILDER

FIELD OF THE INVENTION

This invention relates to the field of distribution of software or data. In particular, the invention relates to peer-to-peer software distribution.

BACKGROUND OF THE INVENTION

Software or data may be distributed from a server to a variety of client processor-based systems. Typically, software packages may be periodically sent to a large number of processor-based systems within a network. Examples of software and data which may be distributed are system software, updates to system software, applications, updates to applications, and other forms of data packages. Such software or data may be distributed from a central server to a large number of clients. Distributing software or data from a server to a large number of clients, particularly as required when a software update is released, involves a large amount of time and resources which increases the cost of such a software update. Devices which require software installation may be in the form of computers, mobile telephones, Personal Digital Assistants (hereinafter referred to as "PDAs"), devices with embedded software, etc.

As the use of mobile devices becomes more widespread through the use of wireless communication, the practicalities of providing updates to software or new software for the mobile devices is increasingly problematic and costly.

Distribution of software typically involves packaging a number of files into one or more containing files on a central server or distribution media. These file(s) are then sent over a network or communications medium, or directly to a target device where the file(s) are opened and installed.

By way of example, the following scenario is presented.

A first device, device A, downloads a software distribution kit from a server. This kit is an executable and, when run, extracts and installs the contained software, carrying out a configuration as necessary.

A second device, device B, requires the same software as device A, and two choices are available:

1) Download the software from the same server at which device A obtained the software.

2) Obtain the software from device A directly, provided device A is within communication range of device B.

It is assumed in this scenario that there are only two devices for simplicity. In reality, there may be an entire range of devices from which to select.

The first choice may be problematic for a number of reasons. The software may be large in size and may therefore take a long time to download due to bandwidth restrictions. This could mean significant expense in terms of download time due to the type of wide area network (WAN) in use. It could be problematic due to intermittent network access; this is particularly evident when the target server is some distance away in network terms, and a wireless network is involved.

Similarly, the server that holds the software repository could become unavailable preventing device B from downloading the software until the server is available again. This is particularly unacceptable in a business environment.

The second choice has a number of advantages that overcome deficiencies of the first choice. The software has already been downloaded by device A, shielding device B from any problems with the server. Download becomes less problematic or costly due to direct connection (peer-to-peer networking) with device A, which should be closer to device B and should involve a lower cost.

However, the problem with the second choice is that the software that device A downloaded has been un-packed and installed on that device. This is likely to mean that the method of installing the software on the device has been lost. For example, a template or base configuration file may have been configured to that particular device's specification upon installation.

This could be overcome by retaining the original software distribution kit; however, this is not guaranteed to exist. The packaged form may have been deleted for the following reasons:

it was automatically cleaned up after the contents were extracted;
  outside intervention deleted the file (i.e. user); or
  the user deleted the installation file as there was not enough space on the device at the time to hold both the packaged and unpackaged forms of the software on the device. This last point is particularly relevant to mobile, pervasive, or embedded devices.

Some method for re-generating the packaged software distribution kit in its original form is required to enable re-distribution to other devices in a peer-to-peer networking environment. The solution is to enable a device to re-create the software distribution kit such that software can be redistributed to other devices for installation. This re-creation may be on the fly, as opposed to storing it locally hence consuming more resources.

Reverse-engineering of an installed software image to create the original, distributable kit allows devices themselves to act as peer-to-peer software distribution servers. This is particularly advantageous in the mobile world where many devices require the same software and currently have to go to some sort of centralized server to retrieve it. Each device becomes capable of acting as a software distribution server in order to propagate software to its neighbors.

A device may propagate the software to its neighbors in many different environments depending on the nature of the device. For example, if the device is a mobile telephone, it may distribute software updates to other mobile telephones which are within range in an office environment. Similarly, if the device is an onboard car computer, it may distribute software to other onboard car computers in a parking lot.

SUMMARY OF THE INVENTION

In accordance with one embodiment of the invention, there is provided a method for software and data distribution, comprising providing an original software package to a first device, installing the original software package and a package builder kit on the first device, wherein the package builder kit is adapted to build a software distribution kit, and transmitting the software distribution kit to a second device.

In accordance with another embodiment of the invention, there is provided a system for software and data distribution, comprising a first device comprising a processor and storage, and an original software package adapted for installation on the first device, wherein the original software package comprises an installation program adapted to install the original software package on the first device, and a package builder kit adapted to build a software distribution kit for transmission to a second device.

In accordance with yet another embodiment of the invention, there is provided a program product stored on a computer readable medium, comprising program code for performing the steps of receiving an original software package at a first device, installing the original software package and a package builder kit on the first device, wherein the package builder kit is adapted to build a software distribution kit, and transmitting the software distribution kit to a second device.

BRIEF DESCRIPTION OF THE DRAWINGS

Embodiments of the present invention will now be described, by way of examples only, with reference to the accompanying drawings in which:

FIGS. 2A and 2B are schematic diagrams of a software distribution system in accordance with one embodiment of the present invention.

FIGS. 4A and 4B are flow diagrams of a software package installation and a software package building process in accordance with one embodiment of the present invention.

BEST MODE FOR CARRYING OUT THE INVENTION

A method and system for software and data distribution is described. Software is a computer program that makes computer hardware work. Software includes system software for an operating system which controls the workings of a computer hardware device and application software which perform tasks using a computer hardware device.

A computer hardware device which runs software may be any form of a wide range of devices with a processing capability including, as examples, computers, mobile telephones, PDAs, devices with embedded software, etc. Devices with the capability to run a computer software program may be provided to the consumer with pre-loaded software; however, the software may require updating in which case software updates must be distributed to the individual devices already in use. In addition, users may wish to install new software on devices. Data for use by a software program may also require distribution or updating.

Distribution of software in the form of system software, updates to system software, applications and updates to applications is generally carried out in two ways. Firstly, the software is distributed on portable storage media, such as CD-ROMs, floppy disks, etc. Secondly, software is downloaded from a computer server via a network. For example, with wireless technology, a mobile telephone software update can be downloaded from a server via wireless telecommunications.

Figure 1:
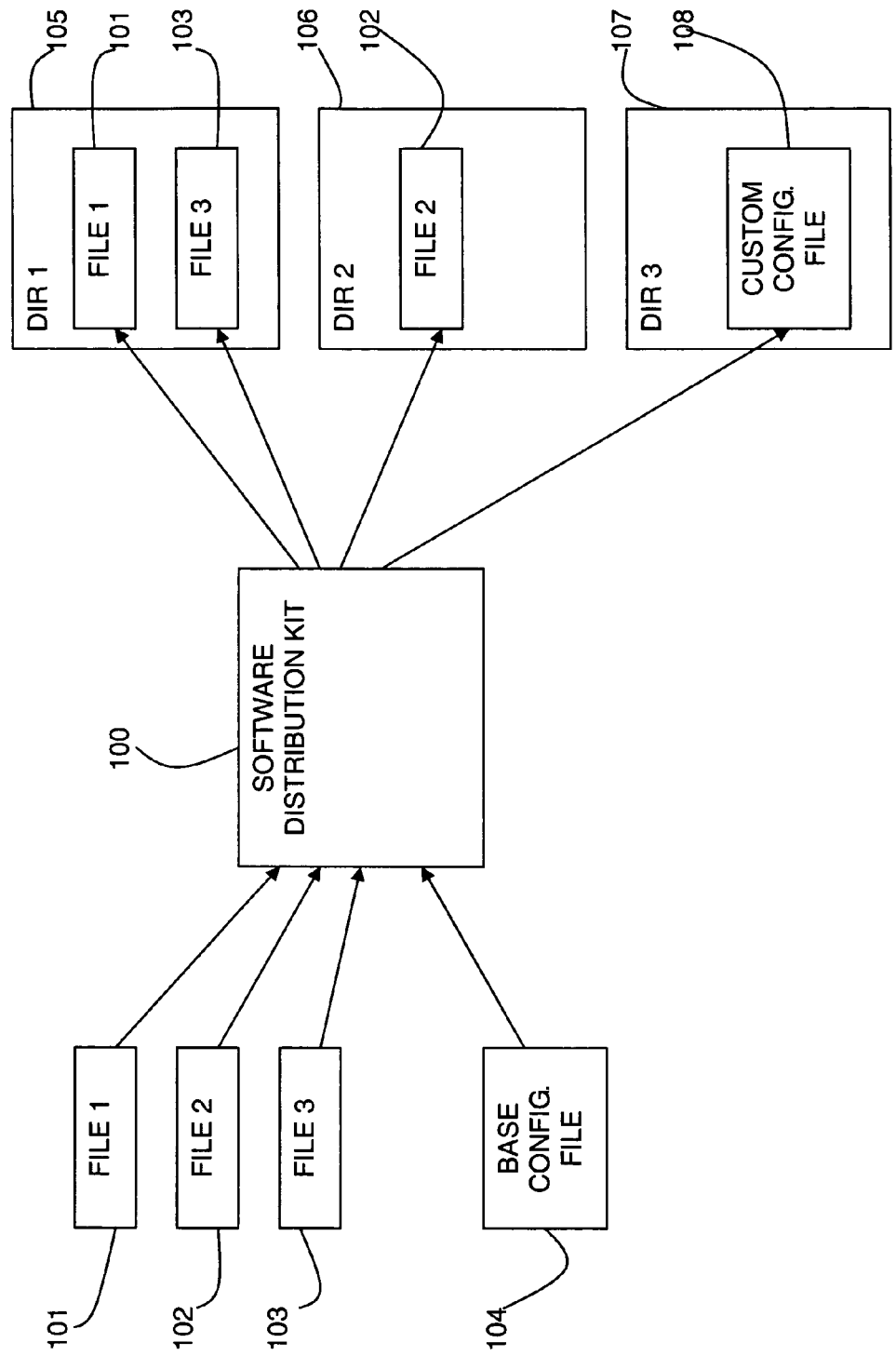
FIG. 1 is a schematic diagram of a software distribution system in accordance with the prior art.

FIG. 1 illustrates a system for software distribution as known in the prior art in which software is installed from software distribution kit 100 as provided on a portable storage medium, for example, a CD-ROM. Software distribution kit 100 may also be downloaded as a package from a server via a network communication. When software distribution kit 100 is downloaded, it may be stored on a receiving device as it is downloaded and then installed after it has been received, or it may be installed as it is downloaded.

The left side of FIG. 1 shows components of software distribution kit 100 before installation. Software distribution kit 100 contains a plurality of files 101, 102, 103 comprising the software and a base configuration file or files 104.

The right side of FIG. 1 shows the software as installed on a device. Files 101, 102, 103 are typically installed to different directories on the device. As depicted in FIG. 1, File 1 101 and File 3 103 are installed in first directory 105 and File 2 102 is installed in second directory 106. Base configuration file 104 is tailored to a device-specific configuration and installed in third directory 107 as customized configuration file 108.

In any event, it should be noted that to provide for reverse-engineering of the installed software, sufficient information contained in software distribution kit 100 must be preserved.

Figure 2A:
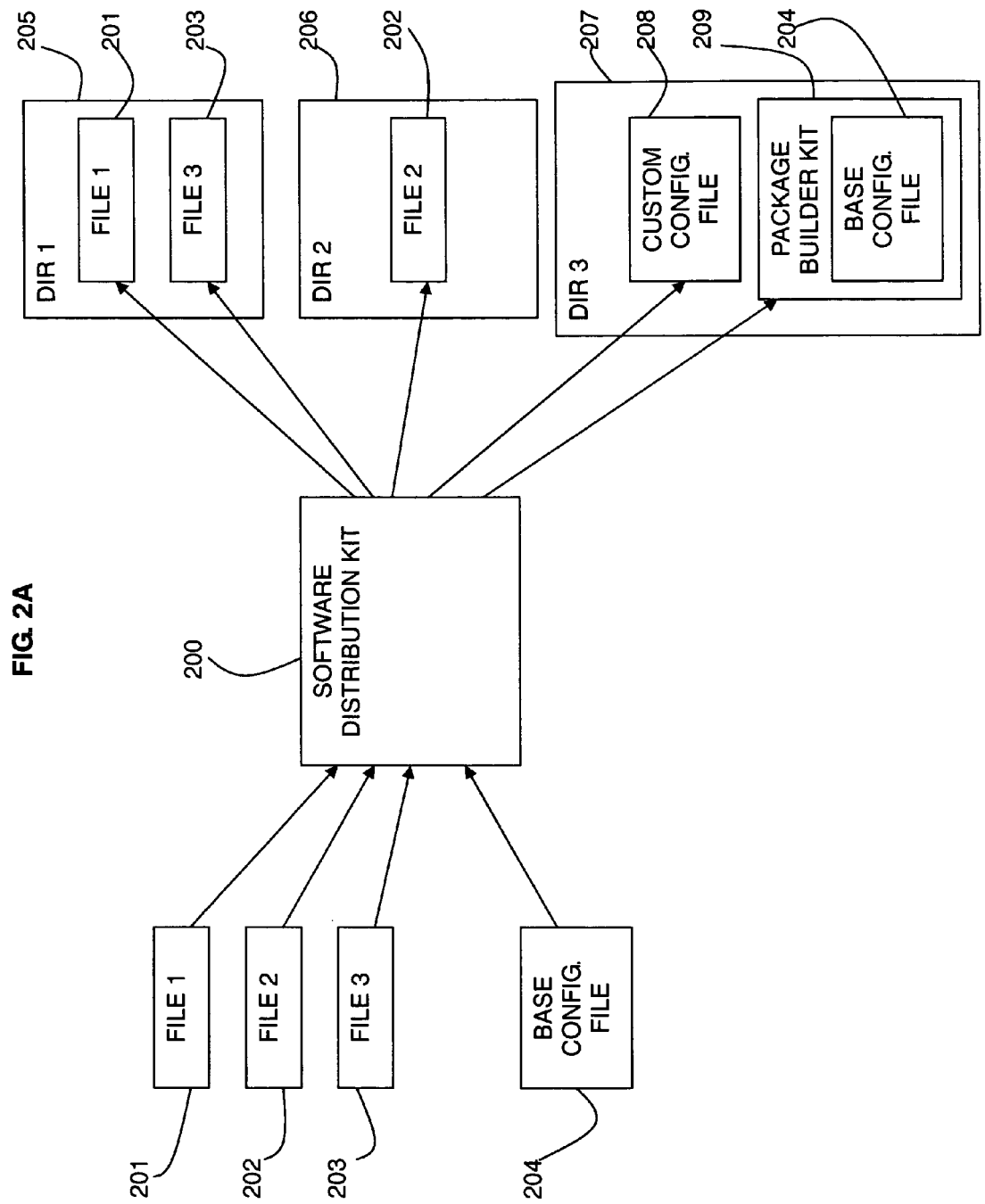

Referring now to FIG. 2A, a system of software distribution using software distribution kit 200 is shown. Software distribution kit 200 contains a plurality of files 201, 202, 203 comprising software, and base configuration file or files 204.

The right side of FIG. 2A shows the software as installed on a device. Files 201, 202, 203 are typically installed to different directories on the device. As depicted in FIG. 2A, File 1 201 and File 3 203 are installed in first directory 205 and File 2 202 is installed in second directory 206. Base configuration file 204 is tailored to a device-specific configuration and installed as customized configuration file 208 in any suitable location, and is shown in FIG. 2A as located in third directory 207.

FIG. 2A depicts additional package builder kit 209, which is extracted to a device's file system, in one example third directory 207, and remains there for the lifetime of the software. Package builder kit 209 contains the following information:

Original base configuration file(s) 204

Some form of descriptor file outlining what files were installed, and to which directories on the device (This provides for the files to be retrieved and put into a rebuild package.)

Associated checksums to confirm that the software package has been received correctly A descriptor file describing the internal structure of the original software distribution kit package (This includes organization of files into directory structures, compression enabled, and checksums to ensure that the files are in place and valid.)

An executable program to build the distribution kit package using the above information and the actual code (i.e. files)

Referring now to FIG. 2B, once software distribution kit 200 has been installed on a device, package builder kit 209 can be used to create new software distribution kit 210 to install the software from the device to a second device using direct, peer-to-peer distribution without being required to refer back to the original copy of software distribution kit 200. New software distribution kit 210 is either substantially identical to the original copy of software distribution kit 200, or a subset of kit 200 with restricted capabilities. For example, new software distribution kit 210 may be restricted to only re-distribute a software package to a particular brand of device, or a particular operating system. The second device must have an installer capability provided either as part of the base build package of the second device or by another mechanism in order to allow the second device to receive software distribution kit 210 from the first device.

In one embodiment, package builder kit 209 is constructed as part of an installation program of software distribution kit 200. When the installation program of software distribution kit 200 is run on a device, the components of package builder kit 209 are installed on the device. When package builder kit 209 is invoked on the device, package builder kit 209 recreates distribution kit 210. Software distribution kit 210 can be recreated either as a complete package stored to disk on the device, or alternatively, software distribution kit 210 can be recreated on-the-fly as it is used to distribute software to a second device so as to save disk space on the first device. Files may be overwritten during this process, if required.

In another embodiment, package builder kit 209 is provided as a unit in software distribution kit 200 including base configuration file 204, plus any other information required to rebuild software distribution kit 210. The described system allows any device that obtained and installed a software program from software distribution kit 200 to act as a re-distributor of that software program.

In yet another embodiment, a software agent is provided that handles installation requests. This agent delivers installed files as a series of components, in effect delivering a software distribution kit by building and sending data on-the-fly without initially creating a full software distribution kit. In other words, the agent would be responsible for creating a software distribution kit which contains only the components necessary for a particular device (i.e. the bare minimum components for that device).

The agent further provides a level of control over a software re-distribution process by controlling which specific sub-components of software distribution kit 200 are actually re-distributed to a second device. For example, files may be excluded which already exist on the second device, or are not required due to a differing operating system or hardware configuration. Alternatively, additional files could also be distributed to satisfy dependencies of the second device.

An example of one embodiment of the present invention is now described with reference to FIGS. 3A and 3B. A software distribution kit is provided on storage medium 301 on which components of software are provided. The components include software files A, B, C 302, a further file D 303 which is a configuration file (for example, an initialization file, e.g. file.ini), and an installation program 304.

First device 310 is shown, on which software is to be installed using the software distribution kit provided on storage medium 301. The software may be installed on first device 310 by any appropriate method, including downloading from another device. First device 310 has an installation capability in the form of installation system 314 which may be part of a base build package of first device 310 or may have been provided by another mechanism.

Installation program 304, sometimes referred to as a set-up program, does most of the work of preparing a software program to work with a device on which it is to be installed by accommodating the specific system configuration of the device. Installation program 304 checks for other peripheral devices attached to device 310 and may request a user to choose from options, creates a storage location for software components, for example on a hard drive of the device, and modifies start up files of the device, as necessary.

Figure 3A:
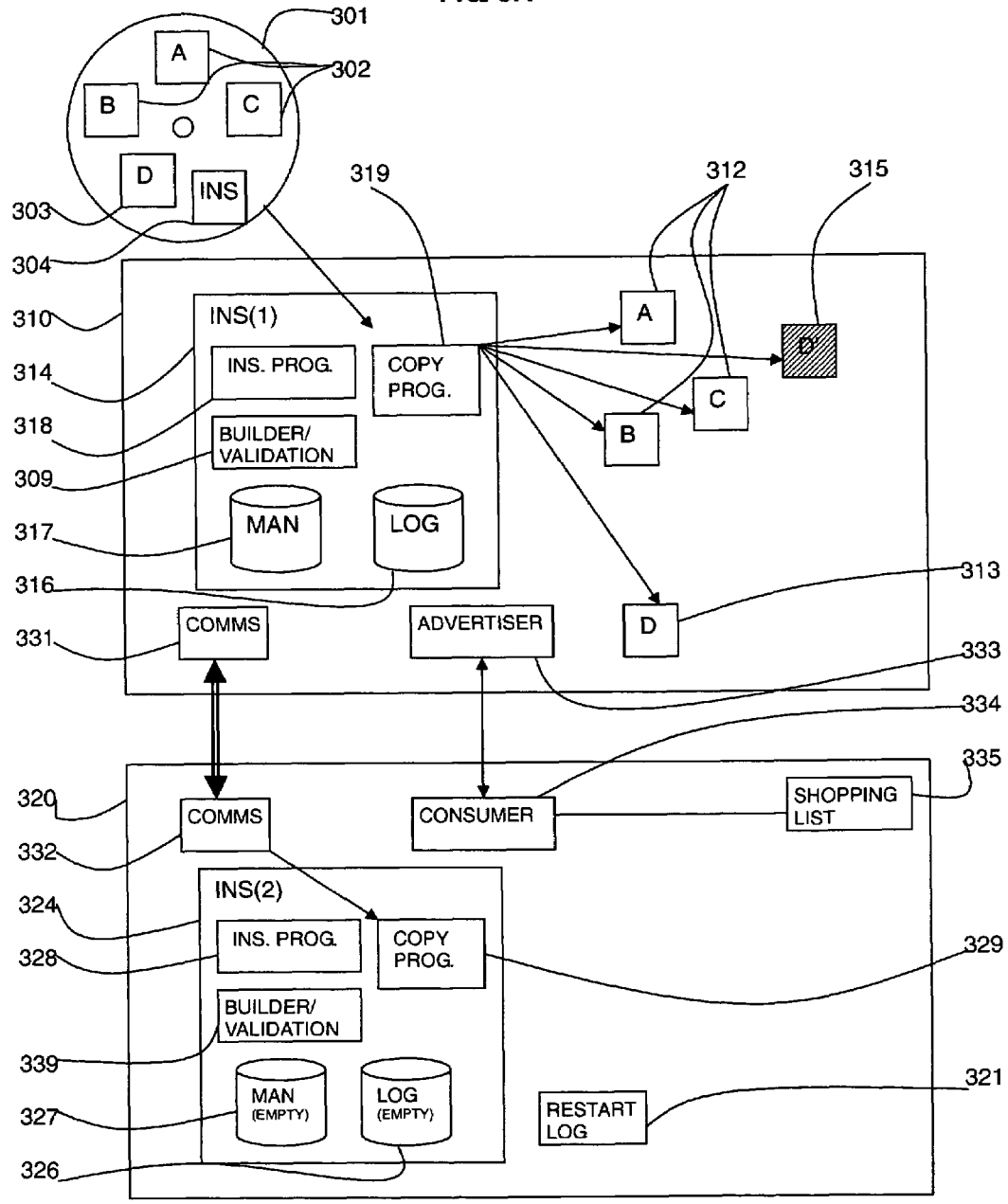
FIGS. 3A and 3B are block diagrams of a software distribution system, during and after re-distribution of software from a first device to a second device, in accordance with one embodiment of the present invention.
Figure 3B:
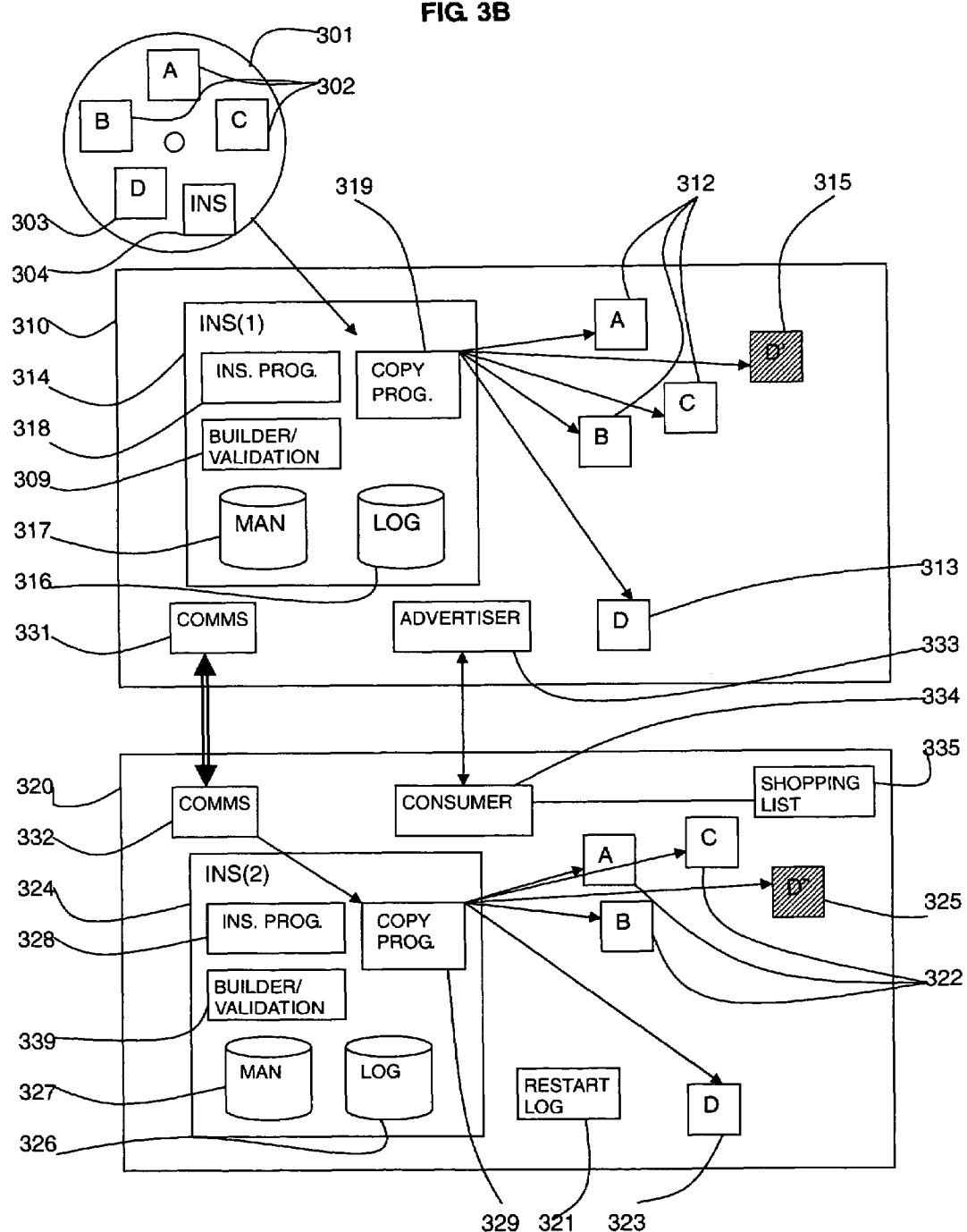

As depicted in FIG. 3A, first device 310 loads software from storage medium 301. A copy of installation program 318 is loaded onto first device 310. Installation program 318 runs copy program 319 to copy software files A, B, C 302 and to store copies 312 of software files A, B, C 302 in directories in a storage memory of first device 310. Configuration file D 303 is also copied from storage device 301 and is customized for the configuration of first device 310. Customized configuration file D' 315 is stored in a directory in a storage memory of first device 310.

A package builder kit is provided as part of installation program 304 of the software distribution kit. When installation program 318 is run on first device 310, the components of the package builder kit are installed on first device 310. The components of the package builder kit include, copy 313 of original configuration file D 303, a first descriptor file in the form of log 316, a second descriptor file in the form of manifest 317, and builder/validation program 309. Copy 313 of original configuration file D 303 is stored in a directory of a storage memory of first device 310. Log 316 keeps track of which files 302, 303 have been installed, and where these files are installed in directories of first device 310. Log 316 also includes checksums. Manifest 317 provides details of the internal structure of the original software distribution package to enable placement and extraction. The details include the organization of files into directory structures, compression or encryption enabled, and associated checksums. An extraction process goes through all the files and a validation system looks at the extraction of the files to verify validity.

Builder program 309 is provided to build the recreation of the software distribution kit using the components of the package builder kit in the form of copy 313 of configuration file D 303, log 316, manifest 317 and copies 312 of files A, B, C 302 stored on first device 310. When builder program 309 of the package builder kit is invoked on first device 310, builder program 309 recreates the software distribution kit enabling software to be installed from first device 310 onto second device 320. Builder program 309 may recreate the software distribution kit in its entirety before commencing installation on second device 320, or alternatively, builder program 309 may recreate the software distribution kit on-the-fly as installation on second device 320 is taking place.

First device 310 has communication system 331 for communicating with communication system 332 of second device 320. The communication can be via any suitable communication channel including wireless communication. Second device 320 has an installation capability in the form of installation system 324 which may be part of the base build package of second device 320 or may have been provided by another mechanism. Second device 320 may request the installation of the software from first device 310.

Copy 324 of installation file 314 is first installed in second device 320 as shown in FIG. 3A including copy program 329, builder program 339 including the validation system, the manifest, and log files 326, 327. Referring now to FIG. 3B, installation file 324 on second device 320 pulls down manifest file 317 and gets and copies (using copy program 329) software files A, B, C 322 from copies 312 on first device 310 together with copy 323 of the original form of configuration file D 313. Manifest file 327 and log file 326 on second device 320 are filled as the installation process takes place. As installation file 324 installs the software files, configuration file D 313 is customized and stored as D" 325 for the configuration of second device 320. Installation file 324 includes restart log 321, which keeps track of the files as they are installed, and if an installation is interrupted, the installation can be re-started from the place at which it failed.

The inclusion of a package builder kit in software installed on second device 320 may be optional. A builder kit may be provided so that second device 320 can in turn recreate a software distribution kit for installation on a third device. In this case, components of a package builder kit are provided as part of installation program 324 installed on second device 320 including builder program 339. When installation program 324 is run on second device 320, components of a package builder kit are installed on second device 320. Alternatively, as an optional measure of control of distribution, a package builder kit may not be provided to second device 320 in which case second device 320 cannot, in turn, pass the software onto a third device.

First device 310 may include advertiser file 333 which advertises to other devices any software distribution kits that device 310 has installed. Second device 320 communicating with first device 310 as consumer 334 may have shopping list 335 of software that device 320 would like to install. If device 320 locates a desired software distribution kit on first device 310, an installation may take place automatically during a communication between devices 310 and 320. When a request for software is received at first device 310 from second device 320, builder program 309 is invoked through communication system 331.

Builder program 309 includes a validation system which carries out a validity check of a software distribution package through manifest file 317 and log file 316. The validity check ascertains if all files of a given software distribution package are valid, in that the files are all recorded to directories that exist, and that any extraction systems are present, etc. If a software distribution package is valid, the transfer request proceeds. If not, and files are missing or invalid, the transfer request is denied. Builder program 309 communicates with installation system 324 on second device 320 and hands across files that comprise a software package by reference to manifest 317 and log 316. In addition, manifest file 317 on first device 310 may be updated to indicate if a given software distribution package is valid or invalid. If a package is invalid, advertiser 333 can stop advertising it as available, or can indicate that the version is invalid. A system manager may be provided on a device to check periodically if software distribution packages are valid and correctly shown in advertiser 333. The system manager interrogates its software distribution kits and records the results accordingly. Further, an external service may manage a plurality of client devices. The external service can inform any one or more of the client devices that it wishes the device to obtain one or more particular software package(s). The client devices can then obtain the software during communication with other devices.

Figure 4A:
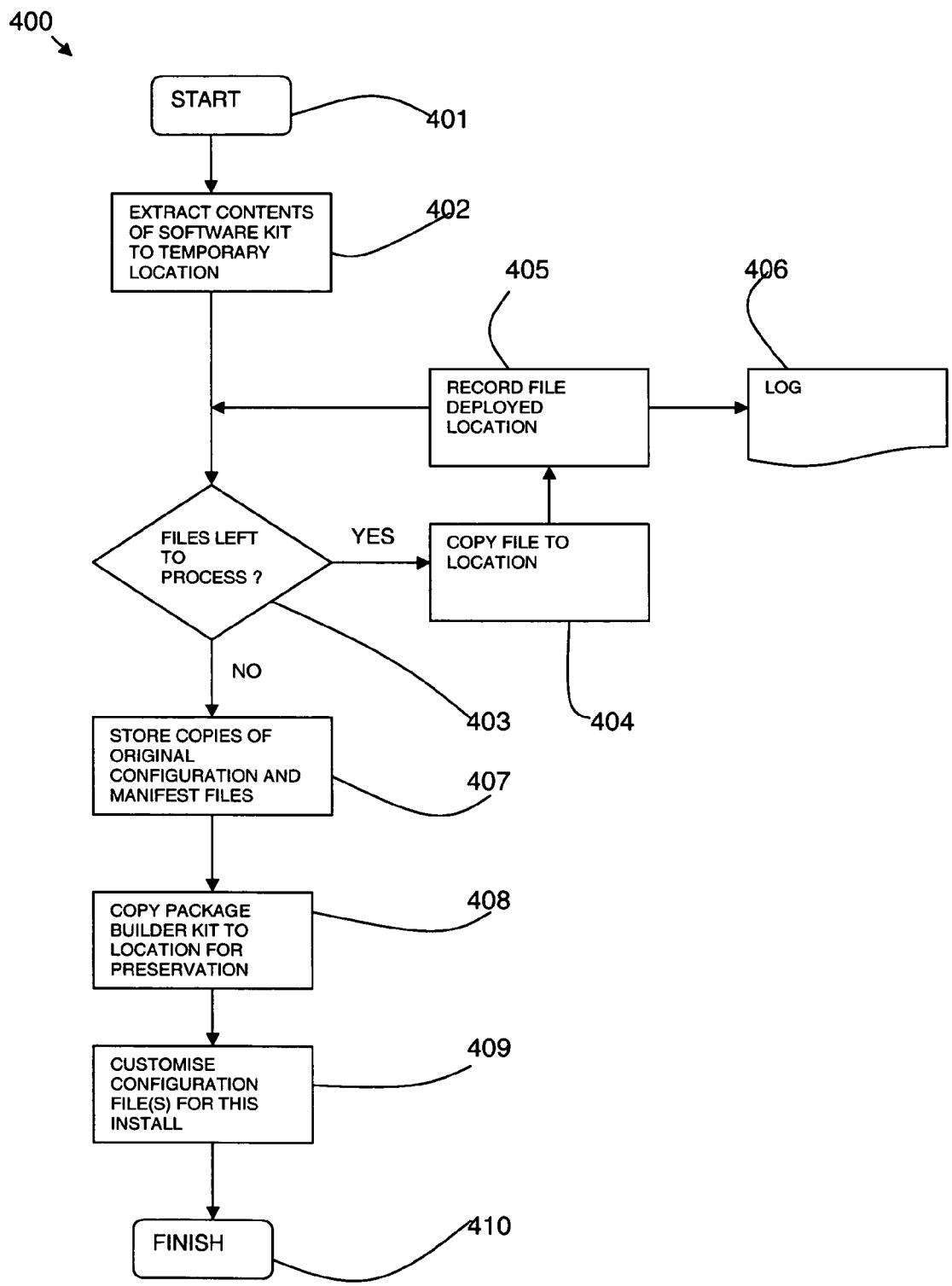

Referring now to FIGS. 4A and 4B, flow diagrams show an exemplary installation of a software package on a first device, and the distribution of a software package already installed on a first device to a second device.

FIG. 4A shows a flow diagram 400 describing the steps involved in installing a software package on a first device. The installation starts in step 401 and the contents of a software kit are extracted in step 402 to a temporary location. It is determined if there are files to process in step 403 and, if so, a file is copied in step 404 to a location on the device. In step 405, the deployed location of the file is recorded in log 406. Steps 404 and 405 are repeated for each file to be processed. If it is determined at step 403 that there are no more files to process, the method proceeds to the next step 407. Copies of the original configuration and manifest files are stored in step 407, and the package builder kit is copied to a location for preservation in step 408. The configuration file(s) for this installation are configured in step 409 and the installation is finished at step 410.

FIG. 4B shows a flow diagram 420 describing the steps involved in distributing a software package already installed on a first device to a second device when invoking a package builder kit. The method starts at step 421 and determines if all the necessary file information is present in step 422. If all the file information is not present, an error is reported in step 423 and the method finishes at step 432, as it is not possible to recreate the software package. If it is determined in step 422 that all the file information is present, a list of the installed file locations is obtained in step 424 from log 406 created during the installation described in flow diagram 400.

It is determined if there are files to process in step 425 and, if so, the position of the file in the original software package is obtained in step 426 from the manifest file. A copy of the file is made in step 427 from the file location and sent to the second device, such that the original software package structure is mimicked. Steps 426 and 427 are repeated for each file to be processed. If it is determined at step 425 that there are no more files to process, the method proceeds to the next step 428. The original preserved configuration files are copied in step 428 to the second device. The software package is sent to the second device in step 429. Optionally in step 430, it is determined if compression is to be performed in step 431 on the software package. The method of distributing a software package as described in flow diagram 420 is then finished at step 432.

The described method and system enable a device to act as a virtual software distribution storage medium.

The present invention is typically implemented as a computer program product, comprising a set of program instructions for controlling a computer or similar device. These instructions can be recorded on a computer readable storage medium such as a CD-ROM, or made available for downloading over a network such as the Internet or a mobile telephone network.

Improvements and modifications can be made to the foregoing without departing from the scope of the present invention.

What is claimed is:

1. A method for software and data distribution, comprising:
providing a first software distribution kit comprising an original software package and a package builder kit comprising an original configuration file to install the original software package, a first descriptor file in the form of restart log to keeps track of files in the original software package as they are installed, a second descriptor file in the form of manifest, and a builder program including validation functionality for recreation of the software distribution kit using the components of the package builder kit to a first device;
installing the original software package and installing a package builder kit on the first device, wherein the package builder kit is configured to rebuild a new software distribution kit to install the original software package from the first device to a second device without being required to refer back to the first software distribution kit; and
transmitting the new software distribution kit to the second device wherein the new software distribution kit includes the package builder kit and the original software package;
wherein the installing the original software package on the first device comprises:
downloading the original configuration file; and
installing the original configuration file, which customizes the original configuration file to a custom configuration file tailored to a specification of the first device, and
wherein the installing the package builder kit comprises storing a copy of the original configuration file from the original software package in the package builder kit.

2. The method of claim 1, wherein the installing the original software package on the first device further comprises constructing the package builder kit.

3. The method of claim 1, wherein the building the software distribution kit further comprises building the software distribution kit during transmission to the second device.

4. The method of claim 1, wherein the building the software distribution kit further comprises building the software distribution kit before transmission to the second device.

5. The method of claim 1, wherein the building a software distribution kit further comprises copying files of the original software package from deployed locations of the files on the first device.

6. The method of claim 1, further comprising the first device advertising the software distribution kit that the first device has installed.

7. The method of claim 6, further comprising the second device requesting the software distribution kit from the first device in response to the first device advertising the software distribution kit.

8. The method of claim 1, wherein an external service manages one or more devices and informs the devices of software packages the devices should obtain.

9. The method of claim 1, wherein the transmitting the software distribution kit to the second device further comprises the first device communicating with the second device utilizing a wireless communication channel.

10. The method of claim 1, wherein the package builder kit further comprises the log of installed files configured to provide respective locations of the installed files on the first device, the manifest file configured to provide internal structure details of the original software package, and the builder program that is an executable program configured to build the software distribution kit.

11. The method of claim 1, wherein the first device further comprises a system manager configured to perform a validity check of a software package having the package builder kit provided on the first device.

12. The method of claim 1, wherein the original software package comprises at least one package selected from the group consisting of a system program, an update to a system program, an application, an update to an application, and a data package.

13. A system for software and data distribution, comprising:
 a first device comprising a processor and storage; and
 a first software distribution kit comprising an original software package configured for installation on the first device and a package builder kit comprising an original configuration file to install the original software package, a first descriptor file in the form of restart log to keeps track of files in the original software package as they are installed, a second descriptor file in the form of manifest, and a builder program including validation functionality for recreation of the software distribution kit using the components of the package builder kit,
 wherein the original software package comprises the original configuration file, an installation program configured to install the original software package on the first device, and the package builder kit configured to rebuild a new software distribution kit to install the original software package from the first device to a second device without being required to refer back to the first software distribution kit for transmission to the second device; and
 program code for transmitting the new software distribution kit to the second device wherein the new software distribution kit includes the package builder kit and the original software package;
 wherein the installation program is operable to:
  install the original configuration file, which customizes the original configuration file to a custom configuration file tailored to a specification of the first device; and
 wherein the package builder kit is operable to store a copy of the original configuration file from the original software package in the package builder kit.

14. The system of claim 13, wherein the installation program configured to install the original software package on the first device further comprises a program configured to construct the package builder kit.

15. The system of claim 13, wherein the package builder kit is further configured to build the software distribution kit during transmission to the second device.

16. The system of claim 13, wherein the package builder kit is further configured to build the software distribution kit before transmission to the second device.

17. The system of claim 13, wherein the package builder kit is further configured to store a copy of the original configuration file from the original software package.

18. The system of claim 13, wherein the package builder kit is further configured to build the software distribution kit by copying files of the original software package from deployed locations of the files on the first device.

19. The system of claim 13, wherein the first device is configured to advertise the software distribution kit that the first device has installed.

20. The system of claim 19, wherein the second device is configured to request the software distribution kit from the first device in response to the first device advertising the software distribution kit.

21. The system of claim 13, further comprising an external service configured to manage one or more devices and inform the devices of software packages the devices should obtain.

22. The system of claim 13, wherein the first device is configured to transmit the software distribution kit to the second device utilizing a wireless communication channel.

23. The system of claim 13, wherein the package builder kit further comprises the log of installed files configured to provide respective locations of the installed files on the first device, the manifest file adapted configured to provide internal structure details of the original software package, and the builder program that is an executable program configured to build the software distribution kit.

24. The system of claim 13, wherein the first device further comprises a system manager configured to perform a validity check of a software package having the package builder kit provided on the first device.

25. The system of claim 13, wherein the original software package comprises at least one package selected from the group consisting of a system program, an update to a system program, an application, an update to an application, and a data package.

26. A program product stored on a computer readable storage medium, comprising program code for performing the steps of:
 providing a first software distribution kit comprising an original software package and a package builder kit comprising an original configuration file to install the original software package, a first descriptor file in the form of restart log to keeps track of files in the original software package as they are installed, a second descriptor file in the form of manifest, and a builder program including validation functionality for recreation of the software distribution kit using the components of the package builder kit to a first device;
 receiving the original software package at the first device;
 installing the original software package and installing the package builder kit on the first device, wherein the package builder kit is configured to rebuild a new software distribution kit to install the original software package from the first device to a second device without being required to refer back to the first software distribution kit; and
 transmitting the new software distribution kit to the second device wherein the new software distribution kit includes the package builder kit and the original software package;

wherein the installing the original software package on the first device comprises:

downloading the original configuration file; and installing the original configuration file, which customizes the original configuration file to a custom configuration file tailored to a specification of the first device, and wherein the installing the package builder kit comprises storing a copy of the original configuration file from the original software package in the package builder kit.

27. The program product of claim 26, wherein the installing the original software package on the first device further comprises constructing the package builder kit.

* * * * *

UNITED STATES PATENT AND TRADEMARK OFFICE
CERTIFICATE OF CORRECTION

PATENT NO. : 7,584,470 B2 Page 1 of 1
APPLICATION NO. : 11/111586
DATED : September 1, 2009
INVENTOR(S) : Barker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1065 days.

Signed and Sealed this

Fourteenth Day of September, 2010

David J. Kappos
*Director of the United States Patent and Trademark Office*